Inventors.
Kurt B. Bredtschneider, &
Joseph A. Englert,

United States Patent Office
3,228,258
Patented Jan. 11, 1966

3,228,258
ADAPTER FOR VALVE ACTUATING MEANS
Kurt B. Bredtschneider and Joseph A. Englert, Chicago, Ill., assignors to Crane Co., Chicago, Ill., a corporation of Illinois
Filed Mar. 11, 1964, Ser. No. 351,089
8 Claims. (Cl. 74—424.8)

This invention relates generally to valve actuating means, and, more particularly, to a valve adapter for such actuating means.

In order to have a better understanding of the background of this invention, it should be understood that at the present time valves, especially those of the larger sizes, such as gate valves and conduit valves, are designed with relatively long yoke arms in order to provide for the required full lift of the valve. Further, such yokes are usually fitted with yoke sleeves which extend beyond the yoke hub having a length only sufficient for the attachment of the usual handwheel for manual operation or with a drive coupling or yoke sleeve adapter when it becomes desirable to provide gear operation for the valve.

It will be understood that with valves provided with such relatively long yoke arms, the valves have a high center of gravity whether provided with a handwheel or with a motor operator on top of the valve. The latter condition may be undesirable because of limitation in head-room provided. Further, because of the relatively extended heights of the yokes, the valves are difficult to install and to operate in such places where limited ceiling height is encountered as for example aboard ship. In many instances, special platforms are also necessary in order to enable the operator to conveniently reach the handwheel or other valve operating means. Further, long yoke arms especially when made in a single piece with the valve bonnet present casting problems.

Therefore, it is one of the more important objects of this invention to eliminate these disadvantages of present designs.

In a study of the valve design, it has been found that a yoke opening between the yoke arms being, say, three times as high as the outside diameter of the valve stuffing box is sufficient to permit lifting the gland and the gland flange where packing of the stuffing box becomes necessary.

Therefore, it is the purpose of this invention to provide a valve in which the valve yoke opening height is maintained at a minimum and preferably does not exceed a height of say three times the stuffing box diameter.

It is another important object to compensate for the inherently low yoke height of this invention so as to provide sufficient lift of the stem on the valves by employing a novel yoke sleeve extending substantially beyond the yoke hub of the valve.

It is therefore another important object to provide a valve yoke and yoke sleeve construction in which the threaded area within the upper end of the yoke sleeve in contact with the stem thread is above the handwheel attachment location thus to provide for the desired full lift of the valve stem and closure member.

Another important object is to provide for a valve actuating mechanism in which an elongated yoke sleeve is employed for cooperation with a gear actuator attachment that will extend into the actuator housing with its stem threads above the coupling or yoke sleeve adapter normally provided between the valve operator unit and the valve yoke sleeve.

The aforementioned structural arrangement results in a gear actuator mounting which is positioned relatively close to the valve flow axis thereby beneficially reducing the center of gravity of the mounting. The latter provision is specially desirable on such pipeline installations where vibration of the piping system occurs.

Accordingly, an important object is to provide for a valve operator means and attachment therefor in which the space required to install and to operate valves is maintained at a minimum.

Other objects and advantages will become more readily apparent upon proceeding with the following description read in light of the accompanying drawings, in which.

Similar reference numerals refer to similar parts throughout the several views.

Figure 1:
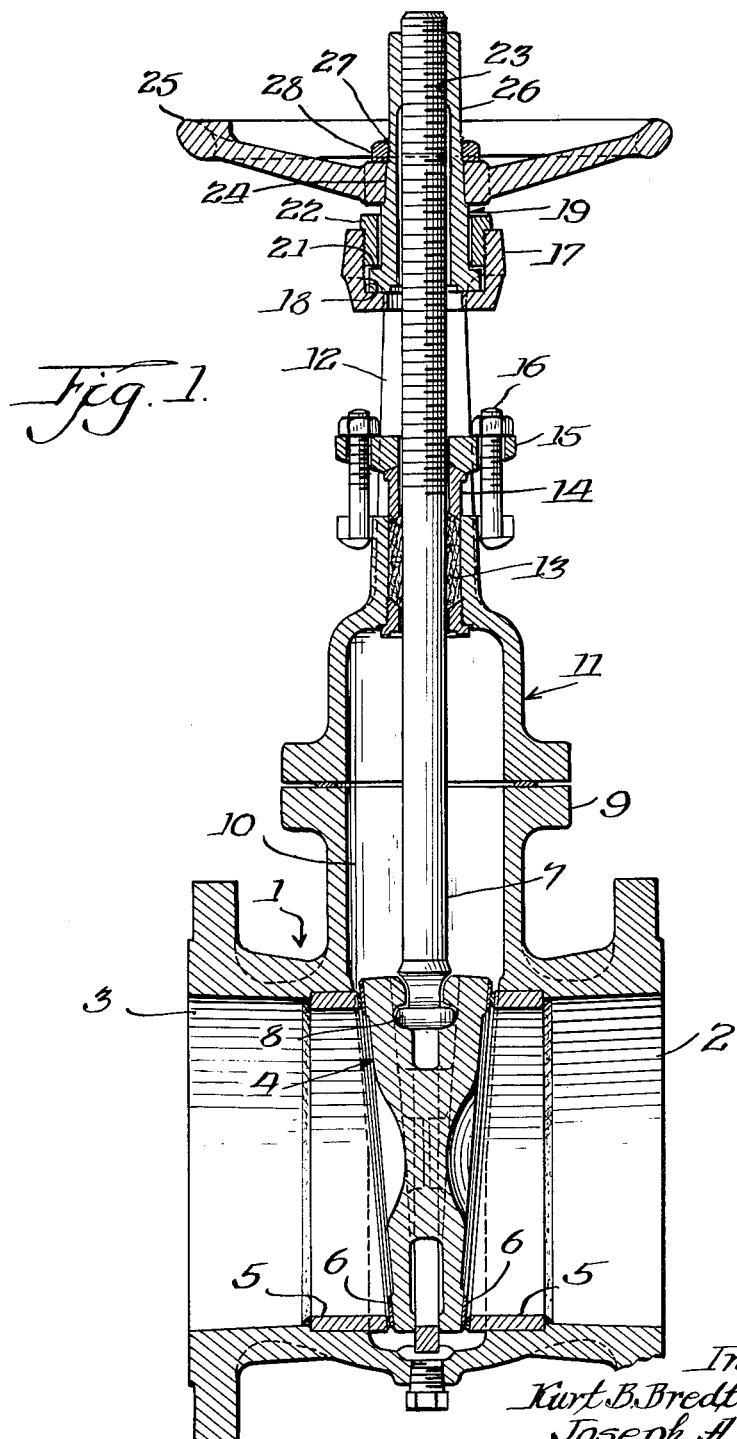
FIG. 1 is a sectional assembly view of a manually operated valve of outside screw and rising stem construction employing the yoke sleeve and yoke of this invention.

Referring now to FIG. 1, a conventional gate valve of relatively large size, say of the order of 24″ and larger pipe size, is shown embodying our invention and having the usual casing generally designated 1 with the flange attachments for connections to a pipeline (not shown) at 2 and 3 respectively and being provided with a valve closure member 4 for engagement with the oppositely disposed annular valve seats 5, the latter being tapered to receive the complementary tapered surfaces 6 of the said valve closure member.

The valve closure member 4 is reciprocally movable by means of the axial movement of the threaded non-rotatable valve stem 7 having a conventional T-head connection 8 engaging the closure member as indicated. Mounted in fluid sealing relationship to the casing 1 and engaging the casing flange 9 a bonnet 11 having the oppositely disposed yoke arms 12 is attached to said casing flange by means of conventional bolting (not shown).

At an upper median portion of the valve, the longitudinally movable stem enters the stuffing box 13, the latter being provided with packing as indicated and having the gland 14 and the gland flange 15, the gland studs and nuts 16 for compression of the said packing. The hub 17 of the yoke as indicated is of frusto-conical configuration on its outer periphery and connects the oppositely disposed yoke arms. The yoke hub construction just described is a separate invention and is covered by pending patent application identified as Serial No. 339,676, filed January 23, 1964.

The said yoke hub 17 is provided with the recess 18 within which the elongated yoke sleeve 19 of this invention is received. The said yoke sleeve is provided with an integral collar 21 and is held in substantially axially fixed position by means of the yoke sleeve threaded retaining bushing 22 shouldered on the hub as indicated.

It will be appreciated that the extent of the clearance provided in the recess 18 of said yoke hub is sufficient to permit of the rotatability of the elongated yoke sleeve which at its upper reduced portion 26 is threaded as at 23 to engage the threads of the stem 7. It will also be understood that the elongated yoke sleeve 19 is provided with a tapered polygonal portion 24 at a distance below said reduced portion 26 upon which the handwheel 25 is fixedly mounted. The elongated portion 26 at a lower portion is externally threaded as at 27 to receive the wheel nut 28 for said fixed retention, the handwheel 25 firmly in position upon the yoke sleeve 19. The handwheel 25 when rotated being fixed on the said yoke sleeve causes said yoke sleeve to rotate similarly and thus effects said axial movement of the stem 7 in opening and closing the valve respectively.

Figure 2:
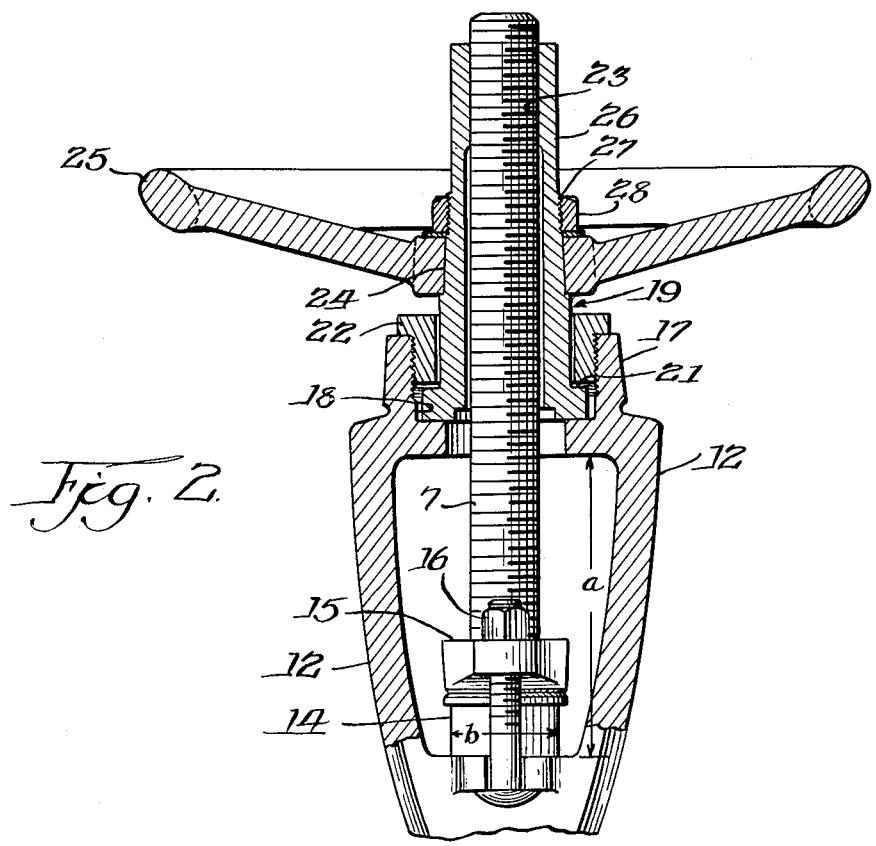
FIG. 2 is a fragmentary enlarged sectional view of the yoke and yoke sleeve connection at ninety degrees to the view shown in FIG. 1.

As shown more clearly in FIG. 2, it has been found desirable, as previously stated to make the height of the space "a" between the yoke arms 12 not to exceed three times the outside diameter of the stuffing box, as indicated at "b."

It will be appreciated that the casing chamber 10 formed by the combined assembly of the bonnet 11 and casing 1 is of a sufficient length to permit of receiving the full length of the closure member 4 when the valve is in the wide open position. It should also be noted that with reference to the planar position of the handwheel 25, the latter member is located substantially below the outer or upper end limits of said yoke sleeve. Thus the over-all operating height of the valve as measured by the handwheel position is lower than a conventional valve of the same size. This arrangement has the advantage that if the valve were confined in a room or space in which the upper limits of the valve stem 7 are immediately adjacent the ceiling the valve handwheel nevertheless is more readily accessible and can be efficiently and conveniently operated by hand.

It will be appreciated that since the construction of this invention permits of the arms being substantially reduced in height an appreciable reduction in the overall weight of the valve is accomplished. It should be further understood that the amount the yoke sleeve is extended above the yoke hub in this construction is substantially equal to the amount the yoke arms are shortened or reduced from the normal height of a conventional valve of the same size.

In considering another embodiment of our invention, let it be assumed that the valve with such positioning as immediately above described is now to be supplied with either a gear operator or a motor operating means, say, with a gear operator of the type known as the Crane "Converto-Gear," identified by United States Patent No. 3,034,371, issued May 15, 1962, to Crane Co., Chicago, Illinois.

Figure 3:
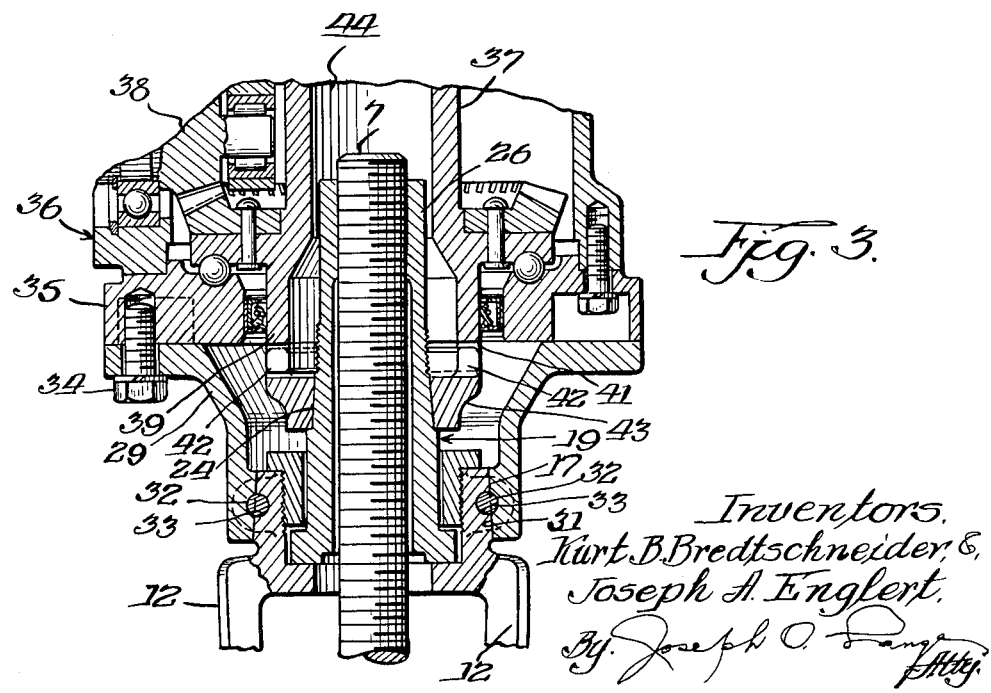
FIG. 3 is a fragmentary sectional assembly view of the valve fitted with a valve operator as hereinafter described in greater detail.

Specifically referring to FIG. 3, the handwheel 25 will now be removed from the tapered surface 24 of the elongated yoke sleeve 19. In this embodiment, said handwheel is to be replaced by the gear operator covered by said patent. The gear adapter housing 29 is provided with the conical bore 31 which coincides with the outer frusto-conical surface of yoke hub 17 and thereby permits of a tight taper fit and connection being made between the yoke 12 and the gear adapter housing 29.

It will be appreciated that the transverse pins 32 are preferably driven into the through-hole portions 33, assuring a solid connection between the valve yoke hub 17 and the gear adapter housing 29. It will also now be apparent that the attached motor or gear operated unit such as that covered by the said patent can easily be attached with its axis in any desired rotative direction relative to the valve flow axis. Further, this can be done without requiring the services of any special tools other than portable drills and without any special jigs or fixtures for effecting the desired attachment of the operator or gear unit. Also, it will be appreciated that the pins 32 by reason of the through drilling employed may be inserted or removed from either side of the operator. This provides the advantage that even if the valve was installed immediately adjacent the wall of the room such installation would not interfere with the mounting or disassembly of the unit.

Continuing now with detail description of a preferred form of drive, the gear adapter housing 29 is preferably bolted as indicated at 34 to the interposed adapter plate 35 which is mounted to receive the motor mounting and/or gearing generally designated 36. As shown in FIG. 3, the internal drive sleeve 37 of said operator is driven by the respective bevel gears 38 partially shown and is provided at its lower portion with an annular hollow extension 39 suitably relieved on its inner periphery as indicated at 41 to form lug means engaging the annular projections or radially extending spaced apart lugs 42 of the driven yoke sleeve adapter 43. The latter member is snugly fitted upon the tapered surface 24 of the elongated yoke sleeve 19 as illustrated. It will be noted that the elongated yoke sleeve extension portion 26 is received within the hollow chamber 44 of the drive sleeve 37 whereby to further enhance the compactness of the unit mounting. Thus, as in the case of the handwheel previously described in connection with FIGS. 1 and 2, the gear mounting of this embodiment is also rendered capable of attachment to the yoke in a plane substantially lower than that previously provided in valves of this type. This construction thereby obtains the advantage of an operating mechanism capable of being positioned with a lower center of gravity and permitting the location of the valve in relatively close quarters not ordinarily possible with conventional valves.

With increased compactness the danger of damage to the valve and operating unit is minimized.

In summary, it will be appreciated that a new and more efficient means of effecting the attachment of either a gear operator or motor operator conveniently to a valve already manually operated in the field has been effected.

While only a single embodiment has been shown and described, the invention is of course capable of broader application particularly to valves in which full lift is a requirement. Therefore, the scope of the invention should be measured by the appended claims.

We claim:

1. In valve actuating means or the like, the combination of a valve bonnet with a hub portion at an upper end thereof, a threaded non-rotatable rising stem extending through said hub portion, the said hub portion being hollow, an elongated yoke sleeve having a collar on its lower end and being rotatably mounted within said hollow portion of said hub portion, said stem being threadedly journaled within said rotatable yoke sleeve, said actuating means being connected to a median portion of said yoke sleeve immediately above said yoke hub portion, the said yoke sleeve elongated portion being reduced in cross-section and extending substantially beyond said connection of the said yoke sleeve with said actuating means whereby the combined overall height of said valve actuating means and said bonnet is substantially reduced.

2. The subject matter of claim 1, the threaded journalling of said stem within said elongated yoke sleeve being located at the upper end portion of said yoke sleeve in a plane at or above the connection of said actuating means with said yoke sleeve.

3. The subject matter of claim 1, the said bonnet comprising a plurality of oppositely disposed yoke arms connected to said yoke hub portion and forming a space therebetween, a stuffing box within the bonnet defining the lower limits of said space, the height of said space being not greater than three times the outside diameter of said stuffing box whereby to reduce the length of said yoke arms to a minimum.

4. The subject matter of claim 3, the said projecting portion of said elongated yoke sleeve being substantially equal to the amount that the yoke arms are shortened from the normal height of a conventional valve of the same size.

5. In valve actuating means or the like, the combination of a valve bonnet with a hub portion at an upper end thereof, a threaded non-rotatable rising stem extending through said hub portion, the said hub portion being hollow, an elongated yoke sleeve having a collar on its lower end and being rotatably mounted within said hollow portion of said hub portion, said stem being threadedly journaled within said rotatable yoke sleeve, said actuating means comprising a removable handwheel connected to a median portion of said yoke sleeve immediately above said yoke hub portion, the said yoke sleeve elongated portion extending substantially beyond said connection of the said yoke sleeve with said removable handwheel whereby the combined over-all height of said handwheel and said bonnet is substantially reduced, a separable yoke sleeve adapter, the said yoke sleeve median portion permitting upon removal of said handwheel for a connection with said yoke sleeve adapter for driven cooperation with either gear or motor actuated mechanisms.

6. The subject matter of claim 5, an internal drive sleeve provided by said gear or motor actuated mechanisms, the said drive sleeve enclosing the upper end portion of said elongated yoke sleeve whereby to substantially reduce the over-all height of the said actuated mechanisms in relation to the valve upon which the said mechanisms are installed.

7. The subject matter of claim 5, the said elongated yoke sleeve having a reduced portion at its upper end projecting through said handwheel or said yoke sleeve adapter upon removal of said handwheel and replacement by said yoke sleeve adapter.

8. The subject matter of claim 5, the said handwheel and said yoke sleeve adapter being identically apertured to interchange mounting on said median portion of the yoke sleeve.

References Cited by the Examiner
UNITED STATES PATENTS

| | | | |
|---|---|---|---|
| 1,033,121 | 7/1912 | Schmid | 251—267 X |
| 2,780,233 | 2/1957 | Volpin | 251—267 X |

DAVID J. WILLIAMOWSKY, *Primary Examiner.*

LEONARD H. GERIN, *Assistant Examiner.*